US012322286B2

(12) United States Patent
Schlueter

(10) Patent No.: US 12,322,286 B2
(45) Date of Patent: Jun. 3, 2025

(54) METHOD OF GENERATING BIDIRECTIONAL GREEN WAVES OF TRAFFIC BY ALTERNATING LIGHTS IN ZONES

(71) Applicant: HansaTekNetics LLC, San Marcos, CA (US)

(72) Inventor: Georg Schlueter, San Marcos, CA (US)

(73) Assignee: HansaTekNetics LLC, San Marcos, CA (US)

( * ) Notice: Subject to any disclaimer, the term of this patent is extended or adjusted under 35 U.S.C. 154(b) by 143 days.

(21) Appl. No.: 18/328,699

(22) Filed: Jun. 2, 2023

(65) Prior Publication Data

US 2024/0404400 A1 Dec. 5, 2024

(51) Int. Cl.
*G08G 1/081* (2006.01)

(52) U.S. Cl.
CPC .................................... *G08G 1/081* (2013.01)

(58) Field of Classification Search
CPC ...... G08G 1/081; G08G 1/082; G08G 1/0145; G08G 1/166; B60W 30/165
See application file for complete search history.

(56) References Cited

U.S. PATENT DOCUMENTS 7,468,680 B2 * 12/2008 Heffernan .............. G08G 1/095 340/916
11,200,801 B1 * 12/2021 Wilkin .................. G08G 1/096
2002/0175831 A1 * 11/2002 Bergan .................. G08G 1/095 340/908
2018/0204451 A1 * 7/2018 Cross ..................... G08G 1/005
2021/0348932 A1 * 11/2021 Friedman ............. G08G 1/0145

* cited by examiner

*Primary Examiner* — Mirza F Alam
(74) *Attorney, Agent, or Firm* — ARC IP Law, PC; Joseph J. Mayo

(57) ABSTRACT

A method of managing traffic lights that generates waves of unimpeded traffic in both directions of a roadway. The roadway is divided into an even number of zones of equal length, which are divided into two groups of alternating zones. A traffic speed and a traffic light duration are selected so that the zone length equals the traffic speed times the light duration. Initially all lights in all zones of one group are set to green, and all lights in all zones of the other group are set to red; then lights are switched in the next cycle to red for the first group and green for the other group. This pattern repeats. The arrangement of alternating zones and the relationship between zone length, speed, and light duration allows vehicles moving in either direction at the specified speed to encounter only green lights, enabling dramatic reductions in travel time.

6 Claims, 7 Drawing Sheets

300
301
302
303
304
201, 202
330
ZoneLength
321
322
323
324
325
326
1
2
3
4
5
6
Odd
Even
Odd
Even
Odd
Even
331
Group 1
332
Group 2

METHOD OF GENERATING BIDIRECTIONAL GREEN WAVES OF TRAFFIC BY ALTERNATING LIGHTS IN ZONES

BACKGROUND OF THE INVENTION

Field of the Invention

One or more embodiments of the invention are related to the field of traffic control methods for vehicles on roadways. More particularly, but not by way of limitation, one or more embodiments of the invention enable a method of generating bidirectional green waves of traffic by alternating lights in zones.

Description of the Related Art

Traffic flow on urban roads experiences significant overloads during rush-hours. Without an effective urban traffic management system, cross-traffic forces the main traffic flow to be interrupted at almost every traffic light creating stop-and-go situations. This unfortunate development reduces a lane's throughput significantly and raises the travel time accordingly during rush-hours when just the opposite response would be needed. The society's economic losses in terms of excessive vehicle operating expense, air pollution, and travel delays are significant.

Industry-wide attempts for synchronizing traffic flow and traffic signals with the objective to create a sustainable smooth traffic flow on urban roads have not been very successful to date. One approach that has been tried is to create "green waves" of traffic that move at a relatively steady speed along a roadway, where vehicles are grouped into platoons that are separated by empty spaces. The traffic lights in the direction of travel are timed so that as each platoon passes by a light, the light is green, and as an empty space between platoons passes by a light, the light is red. In theory if traffic in all platoons moves at a completely uniform speed, the vehicles in the green wave can move along the road without stopping.

The transportation industries' general opinion is that green traffic waves are practical in one direction only. Industry experts believe the traffic flowing in the opposite direction cannot have a green wave, unless the median separates the two traffic directions so that pedestrians wanting to walk across the road can wait on the median until the traffic on the other lane is stopped. Further, an even bigger problem exists at intersections, where cross traffic must be allowed. Because of these unresolved issues, green waves have been implemented on very few suitable instances, in one direction only, but are not being practiced on a broad scale. There are no known solutions that support green waves in both directions of traffic simultaneously.

For at least the limitations described above there is a need for a method of generating bidirectional green waves of traffic by alternating lights in zones.

BRIEF SUMMARY OF THE INVENTION

One or more embodiments described in the specification are related to a method of generating bidirectional green waves of traffic by alternating lights in zones. Embodiments of the invention may manage the timing of traffic lights along a roadway in a manner that allows vehicles travelling at a constant specified speed in either direction to arrive at lights when they are green, greatly reducing travel times and increasing traffic throughput.

One or more embodiments of the method of the invention may include dividing a roadway with traffic in two directions into an even number of zones, where each zone has substantially the same length. It may include partitioning the zones into two groups, each with half of the zones, where the zones of the first group alternate with zones of the second group along the roadway. It may include selecting a speed limit for the traffic in both directions, and selecting a traffic light duration that is substantially equal to the length of each zone divided by the speed limit. It may include controlling traffic lights in the roadway by repeatedly setting all light within zones in the first group to allow traffic to proceed in both directions and setting all lights within zones in the second group to stop traffic in both directions for a period of time equal to the traffic light duration, and then switching light states so that lights within zones in the first group are set to stop traffic in both directions, and lights within zones in the second group are set to allow traffic to proceed in both directions, again for a period of time equal to the traffic light duration.

In one or more embodiments of the invention the roadway may include all or a contiguous portion of a street in a city.

One or more embodiments of the method of the invention may also include controlling traffic lights in cross streets of the roadway so that cross traffic can proceed within a zone of a group when all traffic lights of zones of that group are set to stop traffic in both directions of the roadway.

In one or more embodiments of the invention, at least one zone may contain two or more traffic lights.

In one or more embodiments of the invention, the speed limit may be greater than or equal to 30 mph and less than or equal to 60 mph, the traffic light duration may be greater than or equal to 30 seconds and less than or equal to 120 seconds, and the length of each zone may be greater than or equal to 0.25 miles and less than or equal to 2.0 miles.

BRIEF DESCRIPTION OF THE DRAWINGS

The above and other aspects, features and advantages of the invention will be more apparent from the following more particular description thereof, presented in conjunction with the following drawings wherein:

FIG. 7A shows an illustrative travel time for an unmanaged roadway with random traffic lights, and FIG. 7B shows a much-reduced travel time for a roadway with lights managed according to an embodiment of the invention.

DETAILED DESCRIPTION OF THE INVENTION

A method of generating bidirectional green waves of traffic by alternating lights in zones will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

A "green wave" is a traffic management approach that attempts to organize platoons of cars into a "wave" of traffic that always encounters green lights, so that the traffic can flow steadily without stopping. Existing green wave systems work in only one direction, because traffic lights are synchronized to support platoons moving in that direction; traffic in the opposite direction does not encounter lights synchronized in a regular pattern that supports the same type of unimpeded flow.

Figure 1:
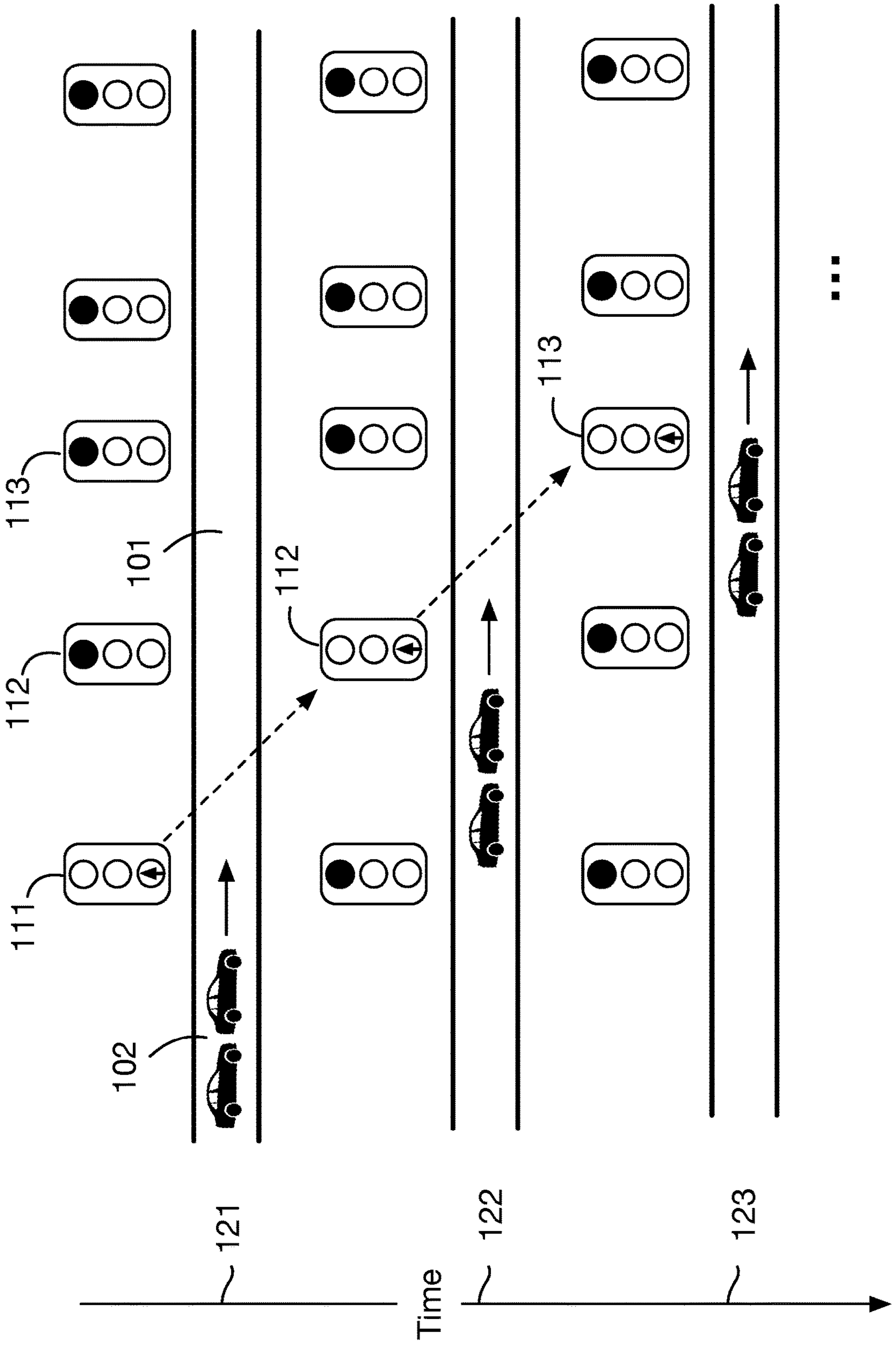
PRIOR ART FIG. 1
FIG. 1 shows a unidirectional green wave system like those that have been attempted in the prior art; this green wave approach works in one direction only.

FIG. 1 shows an illustrative green wave on roadway 101. This roadway may have traffic flowing in both directions, but only one direction (left-to-right in FIG. 1) is managed with a green wave system. FIG. 1 shows three snapshots of the roadway 101 at successive times 121, 122, and 123. A group of vehicles 102 is moving along the roadway in the "green wave" direction. At time 121 the vehicles encounter a green light 111. The next light 112 is timed so that it will turn green when vehicles 102 arrive at this light at time 122, presuming that the vehicles move at a constant speed that matches the timing of the lights. Similarly light 113 is timed so that it will turn green when vehicles 102 arrive at this light at time 123. By synchronizing the lights with the traffic flow, the vehicles in the green wave can travel along the roadway without stopping. However, this synchronization only works in one direction; traffic in the opposite direction (not shown in FIG. 1) will typically hit many red lights and will not move smoothly. This one-way approach is typical of the green wave systems known in the art.

Figure 2:
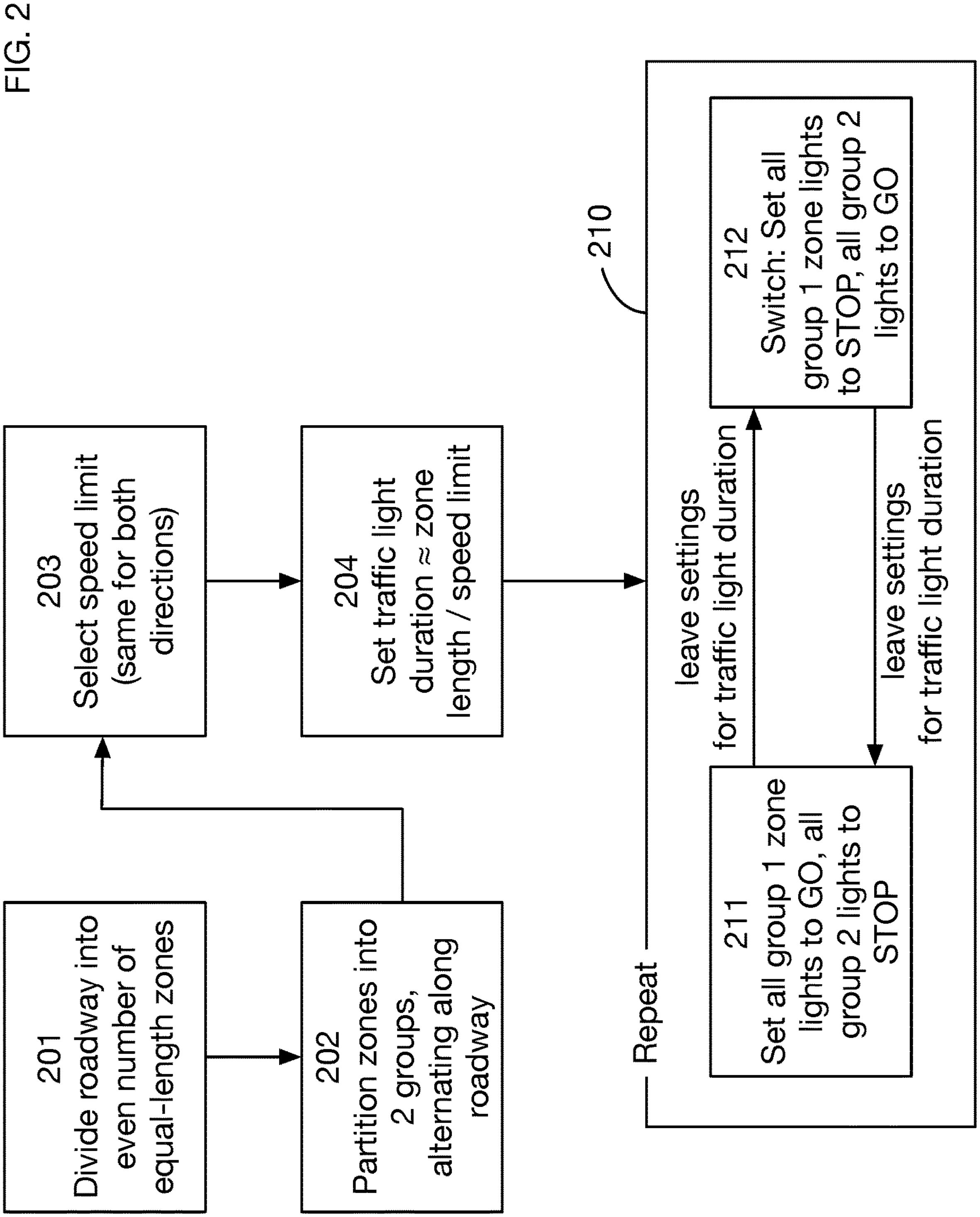
FIG. 2 shows an illustrative flowchart for a method that generates green waves of traffic in both directions along a roadway by dividing the roadway into zones and alternating lights in zones.

One or more embodiments of the invention extend the unidirectional green wave method illustrated in FIG. 1 to both directions of a roadway. Making a green wave work simultaneously in opposite directions is nonobvious, because it imposes two simultaneous constraints on the traffic light timing to support green waves in the two opposite directions. In general, this is an over-constrained situation and has no solution. However, the inventor has discovered that organizing traffic lights into equal-sized zones and alternating green and red lights across alternating zones can generate green waves in both directions that are compatible. FIG. 2 shows a flowchart of illustrative steps of an embodiment of the invention that supports this bidirectional green wave; subsequent figures illustrate steps of this method for traffic on an illustrative roadway with traffic in both directions. The steps of FIG. 2 may be applied to any roadway, which may be all or a contiguous portion of any road, street, highway, freeway, in any location; the roadway may have any number of lanes of traffic in each of the two directions. In particular, without limitation, the steps may be applied on urban streets with many traffic lights, which may be subject to heavy traffic at particular times of day.

In step 201 the roadway (which may be all or a portion of a street, for example) is divided into an even number of zones, where each zone has approximately the same length. Each zone is a contiguous portion of the roadway. Each zone may contain any number of traffic lights. Zone boundaries typically should not be placed directly through a traffic light, so that a light can be assigned unambiguously to one zone. In one or more embodiments, zone boundaries may be adjusted slightly to put traffic lights into logical groupings, while maintaining zones that are approximately (but not necessarily exactly) the same length along the roadway. In step 202, the zones are partitioned into two groups that alternate along the roadway. Because the zones of the groups alternate, each zone is adjacent to zones of the opposite group. Each group contains exactly half of the zones.

Steps 203 and 204 set the speed of traffic and the duration of traffic lights, respectively. These values (speed and traffic light duration) must be related so that the length of a zone equals (at least approximately) the speed times the light duration. This relationship ensures that a green wave of vehicles moving in each direction encounters only green lights, as illustrated below. The traffic speed will be the same for both directions of the roadway and will apply to all of the lanes that are managed by the system. (In one or more embodiments, some of the lanes of traffic may be managed for green waves, and others may be unmanaged.) Illustrative traffic parameters that may be used may include for example, without limitation: zone length between 0.25 miles and 2.0 miles, traffic speed between 30 mph and 60 mph, and traffic light duration between 30 seconds and 120 seconds; these parameters must be related so that the zone length equals (at least approximately) the traffic speed times the traffic light duration. For example, as described below with respect to FIG. 7B, illustrative parameters may be a zone length of 0.5 miles, traffic speed of 60 mph, and traffic light duration of 30 seconds.

Using the parameters selected in steps 201 through 204 (zones, zone groups, zone length, traffic speed, and light duration), traffic lights are then controlled in a repeated loop 210. This loop repeats alternating steps 211 and 212. In step 211, all traffic lights in all zones in the first group are set to GO (typically green), and all lights in all zones in the second group are set to STOP (typically red). (Yellow lights or other intermediate light states may be used at the beginning or end of GO or STOP states, for any desired durations.) After leaving the lights in these states for a time period equal to the traffic light duration selected in step 204, step 212 then switches the lights in each zone to the opposite state: lights in zones of the first group are set to STOP, and lights in zones in the second group are set to GO. Lights are then left in each state for the traffic light duration, and then the cycle repeats at step 211. This process may be repeated as many times as desired.

FIGS. 3 through 6 illustrate the steps shown in FIG. 2 for an illustrative roadway 300. This roadway, which may be all or a portion of a street or highway, has traffic in two directions: direction 301, shown moving from right to left in FIG. 2, and direction 302, shown moving from left to right in FIG. 2. For ease of illustration only one lane is shown in each direction; embodiments of the invention may be applied to roadways with any number of lanes in any direction. Roadway 300 has several traffic lights, which may be at regular or irregular intervals along the roadway; for example, traffic light 303 is at the left end of the roadway, traffic light 304 is at the right end of the roadway, and 14 additional lights are between lights 303 and 304. These lights control the flow of traffic in directions 301 and 302. A green light allows traffic flow in both directions, and a red light stops traffic flow in both directions. (Side street cross traffic or pedestrian crossings may be controlled by other lights, as described below with respect to FIG. 5.)

Step 201 is then applied to roadway 300 to partition the roadway into 6 zones 321 through 326, each of length 330. Each traffic light is assigned to a zone; for example, light 303 is in zone 321, and light 304 is in zone 326. Zones are then partitioned in step 202 into two groups 331 and 332. In this example, zones are numbered consecutively from the left edge; odd-numbered zones are assigned to group 331, and even-numbered zones are assigned to group 332. The number of zones and the zone length are illustrative; one or more embodiments may divide roadways into any number of zones of any length.

Figure 3:
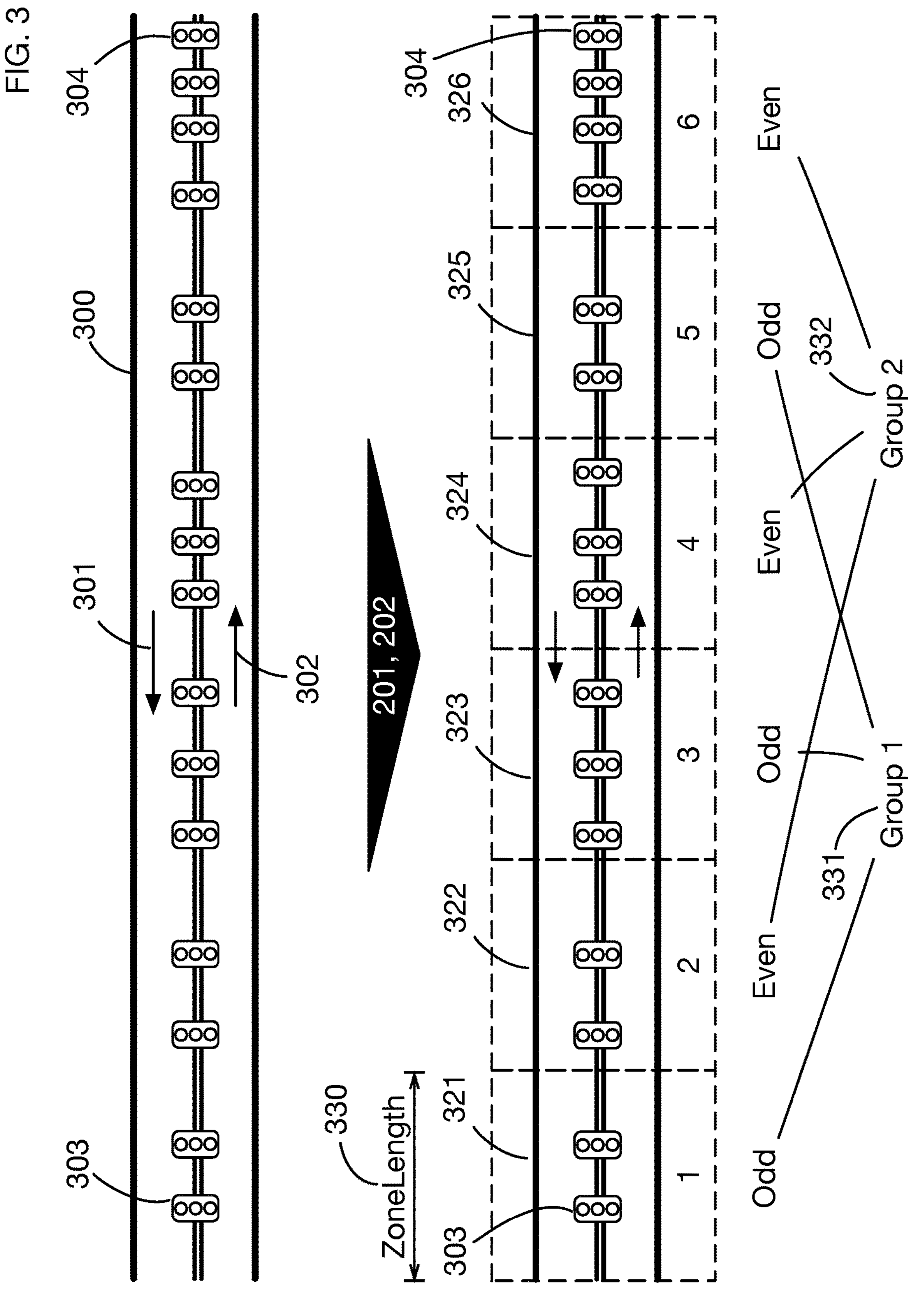
FIG. 3 shows an illustrative roadway and division of this roadway into an even number of equal-length zones.
Figure 4:
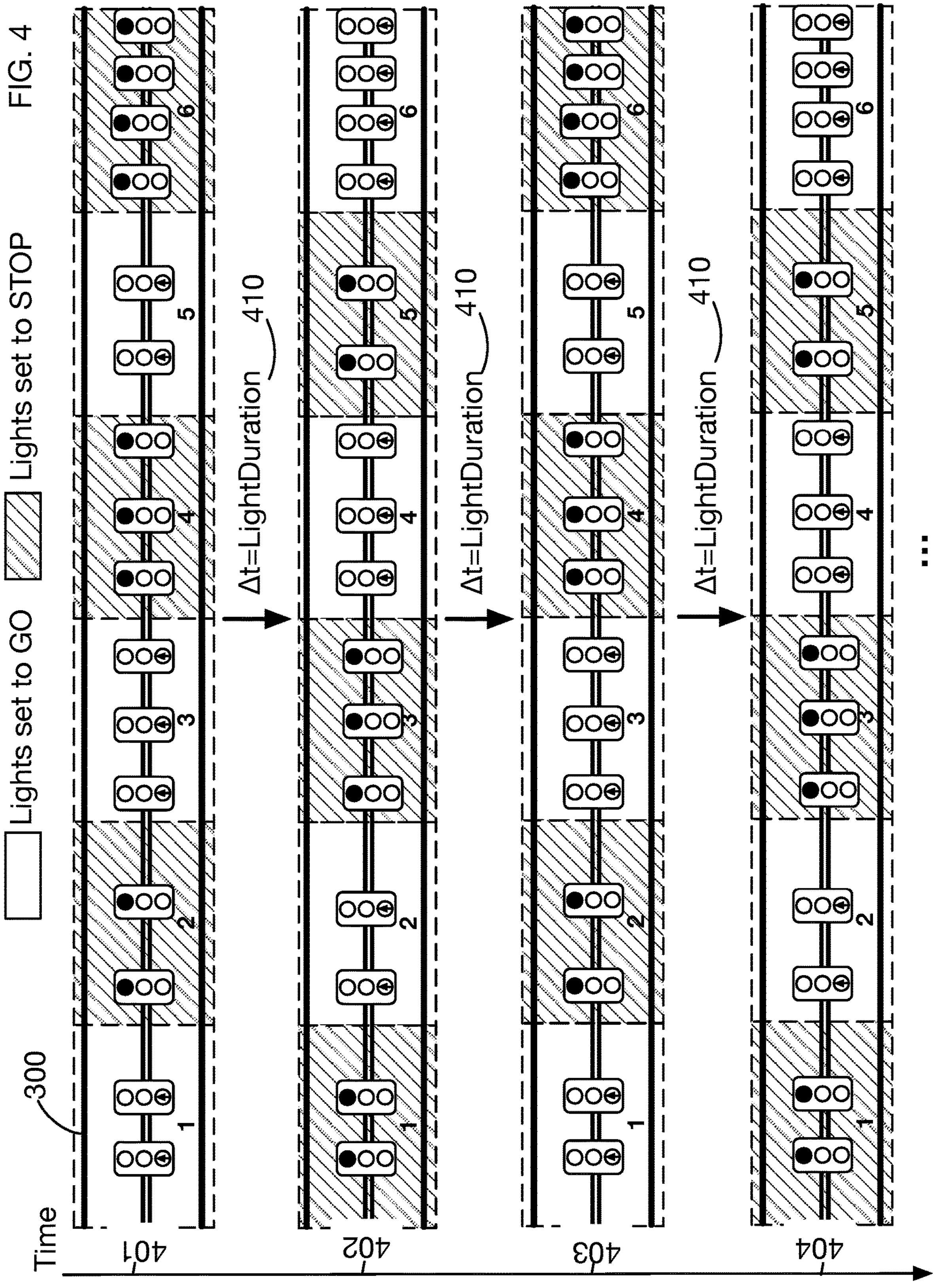
FIG. 4 shows an illustrative time sequence of traffic light states for the zones of the roadway of FIG. 3, with even numbered zones set to red lights when odd numbered zones are set to green lights, and vice-versa.

FIG. 4 shows an illustrative time sequence for the state of the traffic lights in the zones of roadway 300, with zones defines as in FIG. 3. At time 401, lights in group 331 (the odd-numbered zones) are set to the GO state (typically green), and lights in group 332 (the even-numbered zones) are set to the STOP state (typically red). This state corresponds to step 211 in the flowchart of FIG. 2. At time 402, after a delay equal to the traffic light duration 410 (as determined for example in step 204 in the flowchart of FIG. 2), the lights are switched so that all lights in group 331 are set to the STOP state, and all lights in group 332 are set to the GO state. This new state corresponds to step 212 in the flowchart of FIG. 2. At time 403, after another delay equal to the traffic light duration 410, lights are switched back to the same state as at time 401, and then switched again at time 404. This cycle of alternating lights by zone may repeat for any number of iterations.

Figure 5:
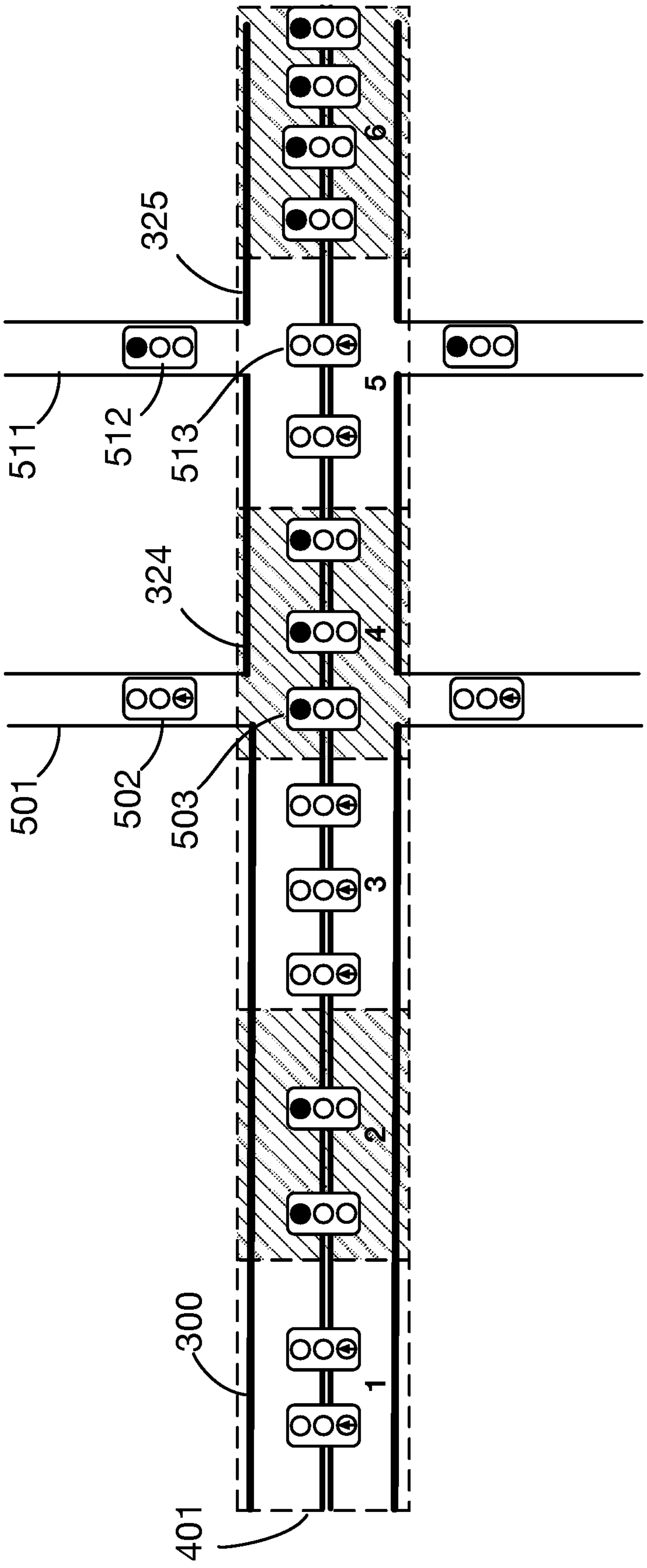
FIG. 5 shows illustrative cross streets for the roadway of FIG. 3; lights controlling traffic on cross-streets are set to green where lights controlling the flow on the main roadway are set to red, and vice-versa.

When traffic lights in a zone are set to STOP (for traffic in both directions along the roadway), some or all of the lights controlling vehicle or pedestrian cross-traffic (across the roadway) may be set to GO, and vice-versa. This situation is illustrated in FIG. 5 with an illustrative cross street 501 crossing zone 324, and another illustrative cross street 511 crossing zone 325. At time 401, traffic lights in zone 324, including light 503, are set to STOP and traffic lights in zone 325, including light 513, are set to GO. Therefore light 502 controlling traffic on cross street 501 is set to GO, and light 512 controlling traffic on cross street 511 is set to STOP. In one or more embodiments traffic lights on cross streets may allow some movements such as right turns even when the zone's lights for traffic along the roadway are set to GO. Another potential benefit of controlling lights by zones is that certain types of cross traffic may be facilitated; for example, a pedestrian can safely cross from any point in a zone diagonally to any other point in the zone on the other side of the roadway while the zone's lights along the roadway are set to STOP.

Figure 6:
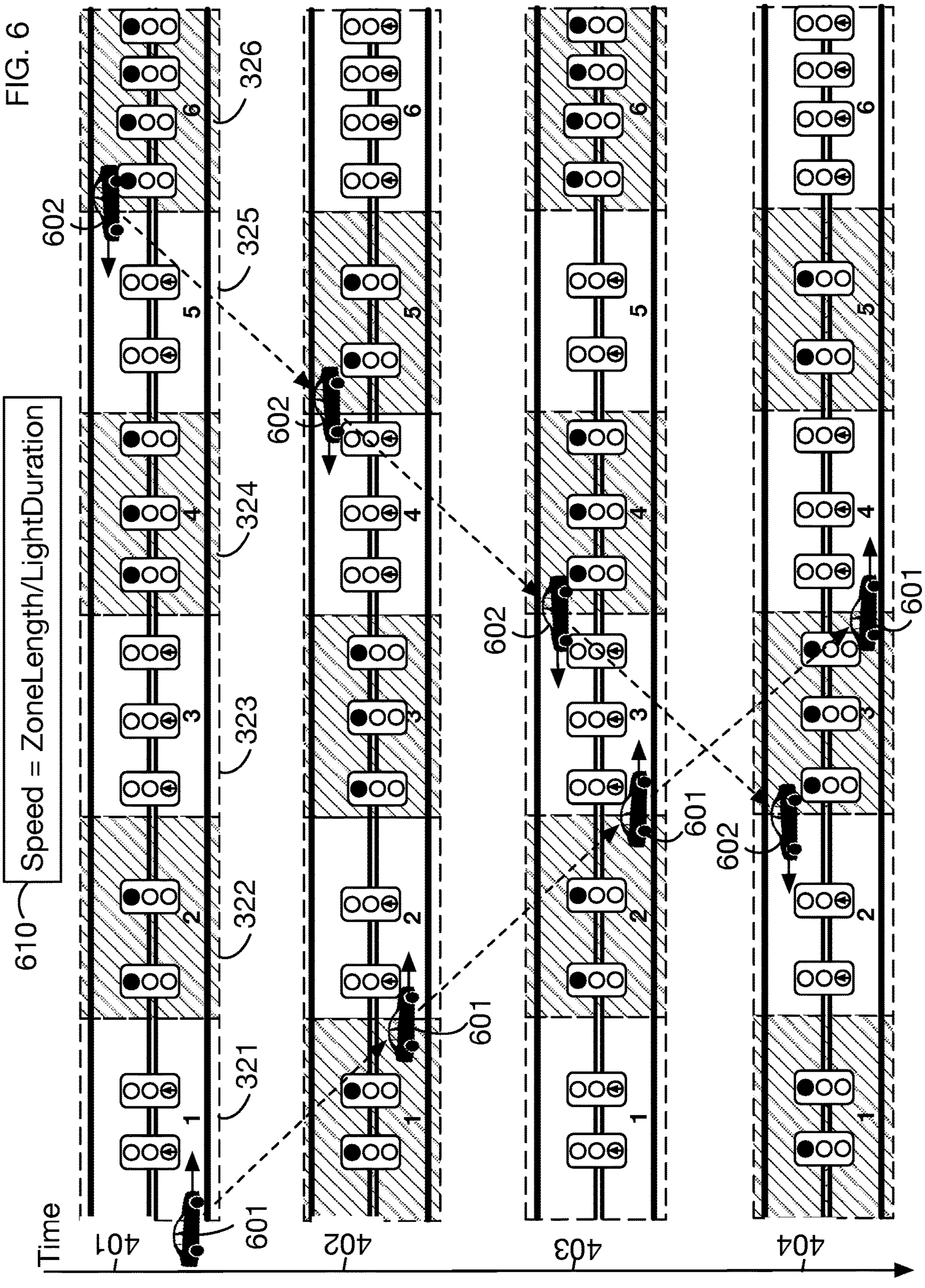
FIG. 6 shows how the traffic light pattern of FIG. 4 generates a bidirectional green wave: cars moving in either direction on the roadway at a speed that is synchronized with the traffic light alternation pattern can proceed without ever stopping.

FIG. 6 illustrates how controlling lights by zones, as described in the flowchart of FIG. 2 and as illustrated in FIG. 4, supports a bidirectional green wave. FIG. 6 shows the same pattern of alternating lights by zone over time as in FIG. 4. Two illustrative vehicles 601 and 602 are shown travelling in opposite directions along the roadway. The vehicle speeds are related to the zone length and traffic light duration by relationship 610, as described above. At time 401, vehicle 601 is at the left edge of zone 321, and vehicle is at the right edge of zone 325. During the time that elapses until the change of lights at time 402, each vehicle travels a distance equal to the zone length, because of relationship 610. Therefore vehicle 601 arrives at zone 322 just when the lights in zone 322 switch from STOP to GO; similarly, vehicle 602 arrives at zone 324 just when lights in zone 324 switch from STOP to GO. This pattern continues at subsequent times for light changes so that each vehicle can proceed along the roadway without stopping. This example illustrates that a green wave is supported in both directions of travel, due to the alternation of zones, the switching of lights in the alternating pattern, and the relationship 610 between zone length, light duration, and speed.

Figure 7A:
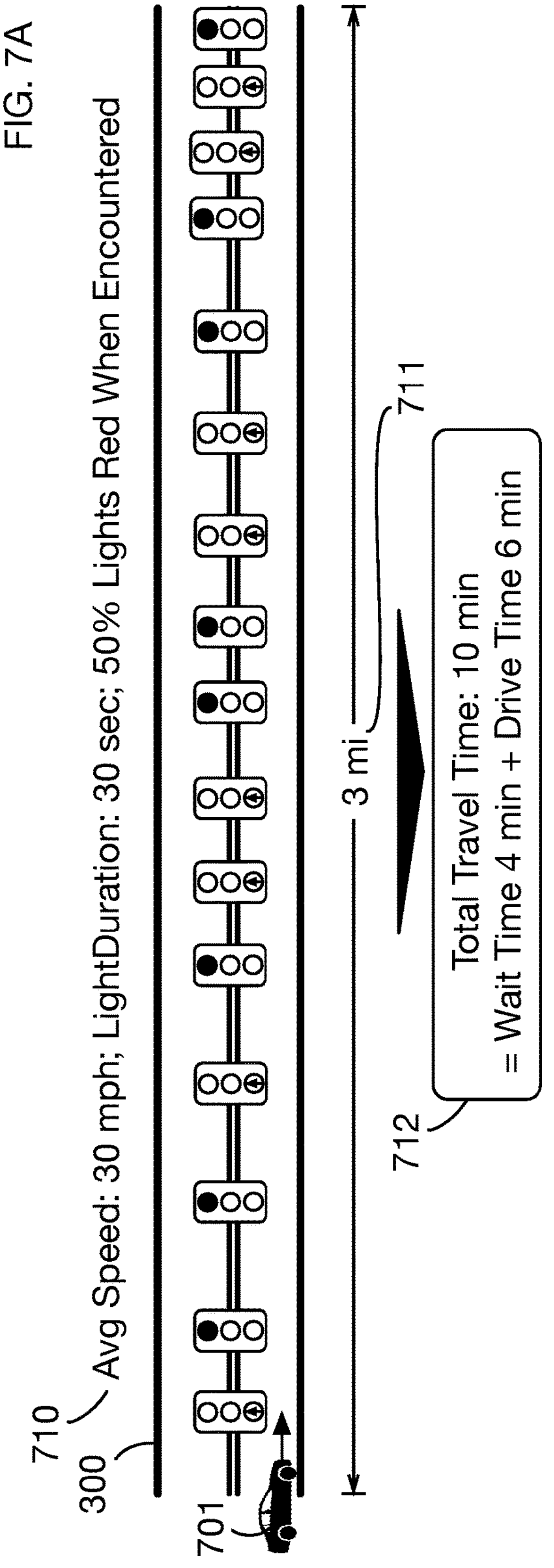
FIGS. 7A and 7B illustrate the potential benefit of the invention on travel time.
Figure 7B:
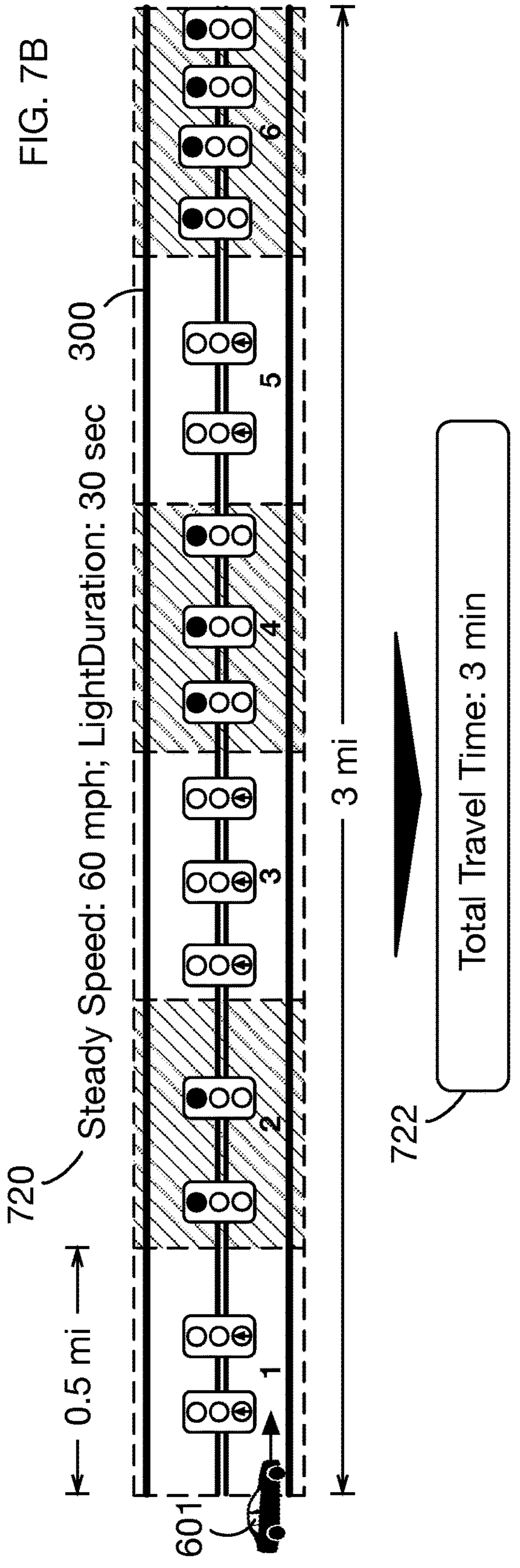

FIGS. 7A and 7B illustrate the potential benefit of the bidirectional green wave on travel times. These figures show illustrative scenarios for a vehicle traversing the full length of roadway 300. FIG. 7A shows a scenario without the invention, where lights are switched in an uncoordinated manner, for example based on traffic sensors or on unsynchronized light timers. FIG. 7B shows a scenario with an embodiment of the invention applied to manage the roadway in zones as shown for example in FIG. 6. Using illustrative parameters 710, in FIG. 7A vehicle 701 encounters red lights at half of the 16 lights along roadway 300; each red light lasts 30 seconds after the time the vehicle arrives at the red. Because the vehicle must accelerate and decelerate frequently, its average speed when moving is only 30 mph. The length 711 of the roadway 300 is 3.0 miles. With these parameters (for illustration), the total travel time 712 for vehicle 701 along the roadway is 10 minutes. In FIG. 7B, vehicle 601 moves as shown in FIG. 6. Each zone is 0.5 miles in length. Illustrative traffic parameters 720 include a vehicle speed of 60 mph and a traffic light duration (within each zone) of 30 seconds. These parameters are consistent with the relationship 610 that leads to the green wave phenomenon: the zone length (0.5 miles) equals the speed (60 mph) times the light duration (30 seconds=1/120 hr.). In FIG. 7B the total travel time 722 for vehicle 601 is 3 minutes, which is less than one third of the travel time experienced by vehicle 701 in FIG. 7A.

The parameters shown in FIGS. 7A and 7B are illustrative, and the benefit of the bidirectional green wave method may vary depending on these parameters. In general, however, travel times may be greatly reduced, in both directions, by applying embodiments of the invention to traffic flow in congested areas.

While the invention herein disclosed has been described by means of specific embodiments and applications thereof, numerous modifications and variations could be made thereto by those skilled in the art without departing from the scope of the invention set forth in the claims.

What is claimed is:

1. A method of generating bidirectional green waves of traffic by alternating lights in zones, comprising:

dividing a roadway comprising traffic in two directions into an even number of zones, wherein each zone of said even number of zones has a same length;

partitioning said even number of zones into two groups, each group of said two groups comprising half of the even number of zones, wherein zones in a first group of said two groups alternate with zones of a second group of said two groups along said roadway;

selecting a speed limit for said traffic in said two directions of said roadway;

selecting a traffic light duration equal to a length of said each zone divided by said speed limit;

controlling traffic lights in said roadway by repeatedly setting all traffic lights within said zones in said first group to allow said traffic to proceed in both directions of said roadway, and setting all traffic lights within zones in said second group to stop said traffic in said both directions of said roadway, for a period of time equal to said traffic light duration; and, after said period of time equal to said traffic light duration, setting said all traffic lights within said zones in said first group to stop said traffic in said both directions of said roadway, and setting said all traffic lights within said zones in said second group to allow said traffic to proceed in said both directions of said roadway, for said period of time equal to said traffic light duration.

2. The method of generating bidirectional green waves of traffic by alternating lights in zones of claim 1, wherein said roadway comprises all or a contiguous portion of a street in a city.

3. The method of generating bidirectional green waves of traffic by alternating lights in zones of claim 1, further comprising controlling traffic lights in cross streets of said roadway to allow cross traffic to proceed within said zones of a group of said two groups when said all traffic lights within said zones of said group are set to stop said traffic in said both directions of said roadway.

4. The method of generating bidirectional green waves of traffic by alternating lights in zones of claim 1, wherein at least one zone of said even number of zones contains two or more traffic lights.

5. The method of generating bidirectional green waves of traffic by alternating lights in zones of claim 1, wherein said speed limit is greater than or equal to 30 mph and less than or equal to 60 mph;

said traffic light duration is greater than or equal to 30 seconds and less than or equal to 120 seconds; and, said length of said each zone is greater than or equal to 0.25 miles and less than or equal to 2.0 miles.

6. The method of generating bidirectional green waves of traffic by alternating lights in zones of claim 1, wherein said zones in said first group alternate with said zones of said second group along said roadway such that said each zone of said first group is adjacent to a zone of said second group.

* * * * *